United States Patent
Hayashi et al.

[11] Patent Number: 6,104,522
[45] Date of Patent: *Aug. 15, 2000

[54] OPTICAL SCANNING APPARATUS WITH CONTROLLED SAG AND GHOST

[75] Inventors: Yoshinori Hayashi; Seizo Suzuki, both of Kanagawa, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/927,892

[22] Filed: Sep. 11, 1997

[30] Foreign Application Priority Data

Sep. 13, 1996 [JP] Japan .................................. 8-243099
Jan. 9, 1997 [JP] Japan .................................. 9-002333

[51] Int. Cl.$^7$ .................................................. G02B 26/08
[52] U.S. Cl. ........................... 359/207; 359/216; 359/196
[58] Field of Search .................................... 359/196, 207, 359/216

[56] References Cited

U.S. PATENT DOCUMENTS

| | | | |
|---|---|---|---|
| 5,270,851 | 12/1993 | Makino et al. | 359/216 |
| 5,418,639 | 5/1995 | Yamazaki | 359/216 |
| 5,541,760 | 7/1996 | Iizuka et al. | 359/205 |
| 5,557,448 | 9/1996 | Endo et al. | |
| 5,563,729 | 10/1996 | Nakamura et al. | 359/205 |
| 5,581,392 | 12/1996 | Hayashi | |
| 5,652,670 | 7/1997 | Hayashi | |

*Primary Examiner*—Cassandra Spyrou
*Assistant Examiner*—Jared Treas
*Attorney, Agent, or Firm*—Oblon, Spivak, McClelland, Maier & Neustadt, P.C.

[57] ABSTRACT

An optical scanning apparatus includes a light source, a first optical system which includes a coupling lens for coupling a beam from the light source, a polygon mirror for deflecting the beam from the first optical system at a constant angular velocity, and a second optical system which includes a scanning and imaging element for converging the deflected beam on a scanned surface so as to scan the scanned surface substantially at a constant velocity, wherein following conditions are satisfied $$\Theta/2 < \alpha < (4\pi/N) - (\Theta/2) \quad (1)$$

$$R \cdot \sin(\alpha/2) \cdot 1.03 < h < R \cdot \sin(\alpha/2) \cdot 1.1 \quad (2)$$

where N indicates the number of deflecting and reflecting surfaces of the polygon mirror, R indicates a radius of an inscribed circle in the deflecting and reflecting surface, $\alpha$ indicates an angle formed by a chief ray of the deflected beam so as to be perpendicular to the scanned surface and an optical axis of the first optical system, $\Theta$ indicates an angular field of view that corresponds to an effective write width on the scanned surface and h indicates a distance between a center of rotation of the polygon mirror and the optical axis of the first optical system.

25 Claims, 13 Drawing Sheets

$\theta = 44.2°$

-3.00    3.00
(mm)

$\theta = -45.7°$

CURVATURE OF FIELD
(--- MAIN-SCANNING DIRECTION
— SUB-SCANNING DIRECTION)

$\theta = 44.2°$

-1.00    1.00
(%)

$\theta = -45.7°$

CONSTANT-VELOCITY
CHARACTERISTIC (BROKEN LINE)
LINEARITY (SOLID LINE)

θ = 44.95°

−3.00   3.00
(mm)

θ = −44.95°

CURVATURE OF FIELD ( --- MAIN-SCANNING
      DIRECTION
  — SUB-SCANNING
      DIRECTION )

θ = 44.95°

−1.00   1.00
(%)

θ = −44.95°

CONSTANT-VELOCITY
CHARACTERISTIC (BROKEN LINE)

LINEARITY (SOLID LINE)

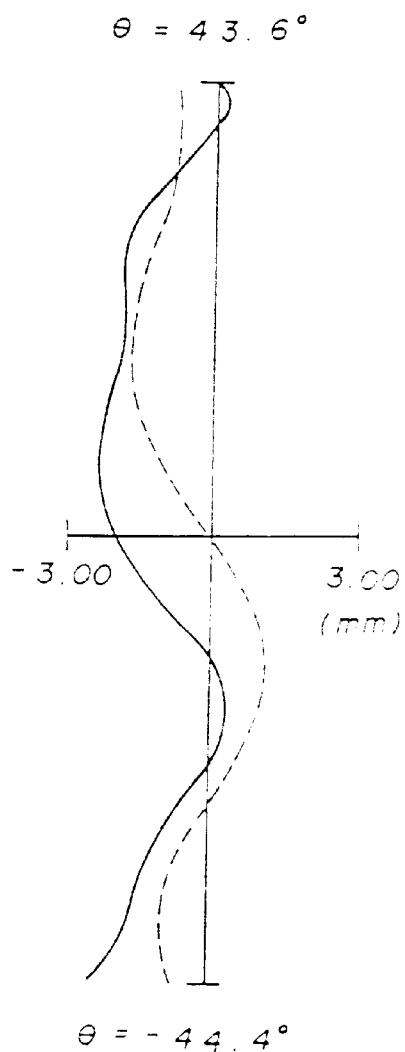
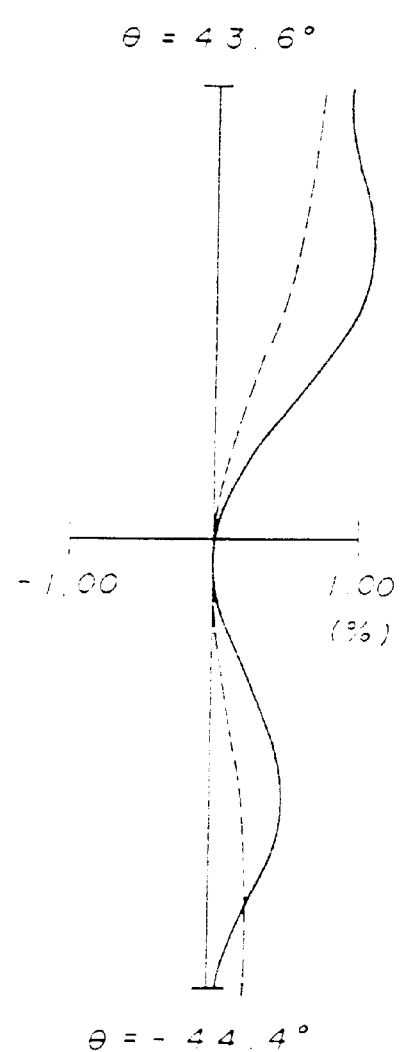

$\theta = 43.6°$ $-3.00$   $3.00$
(mm)

$\theta = -44.4°$

CURVATURE OF FIELD ( --- MAIN-SCANNING
       DIRECTION
  ── SUB-SCANNING
       DIRECTION )

$\theta = 43.6°$ $-1.00$   $1.00$
(%)

$\theta = -44.4°$

CONSTANT-VELOCITY
CHARACTERISTIC (BROKEN LINE)
LINEARITY       (SOLID LINE)

CURVATURE OF FIELD
( --- MAIN-SCANNING DIRECTION )
( — SUB-SCANNING DIRECTION )

CONSTANT-VELOCITY
CHARACTERISTIC (BROKEN LINE)
LINEARITY (SOLID LINE)

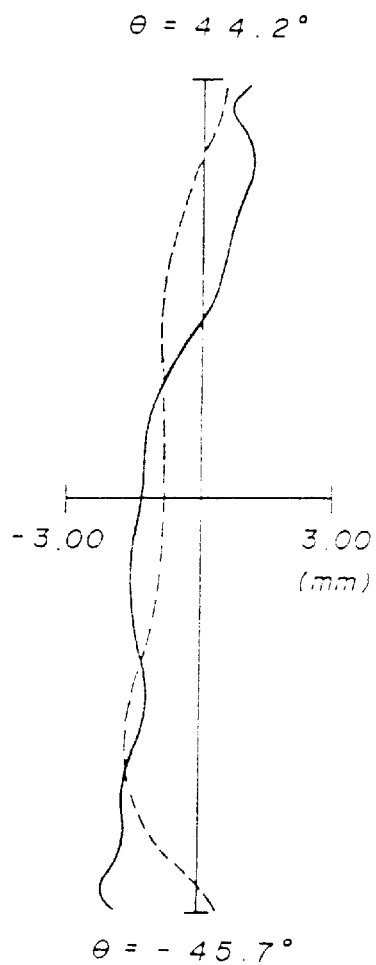 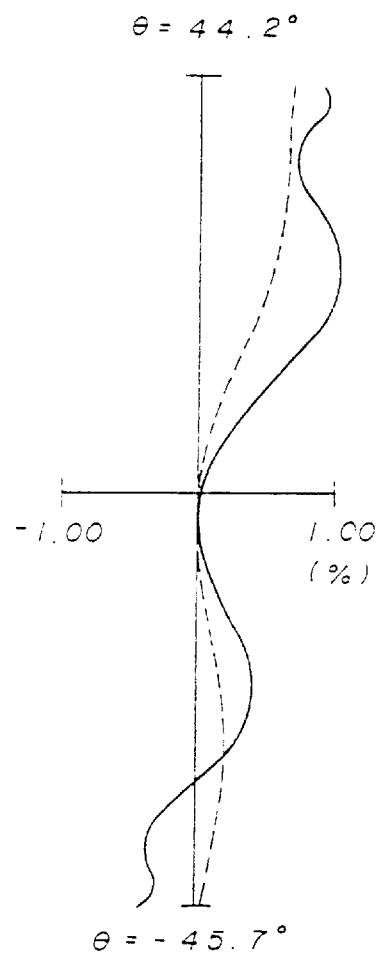

θ = +44°

-3.00 — 3.00 (mm)

θ = -44°

CURVATURE OF FIELD
( --- MAIN-SCANNING DIRECTION )
( — SUB-SCANNING DIRECTION )

θ = +44°

-1.00 — 1.00 (%)

θ = -44°

CONSTANT-VELOCITY CHARACTERISTIC (BROKEN LINE)
LINEARITY (SOLID LINE)

OPTICAL SCANNING APPARATUS WITH CONTROLLED SAG AND GHOST

BACKGROUND OF THE INVENTION

1. Field of the Invention

The present invention generally relates to optical scanning apparatuses and, more particularly, to an optical scanning apparatus in which adverse effects caused by sag and ghost are reduced.

2. Discussion of the Background

An optical scanning apparatus is well known for its application in digital copiers and optical printers. Generally a polygon mirror is used in an optical scanning apparatus to deflect a light beam. Because a center of rotation of a polygon mirror does not coincide with a deflecting and reflecting surface, the position of reflection of a beam at the deflecting and reflecting surface varies as the polygon mirror rotates. Such a phenomenon is known as a sag.

If the optical system of an optical scanning system is designed without allowing for a sag, the resultant performance of the optical scanning apparatus in terms of curvature of field and the like is unfavorable such that the performance level expected from the design is not obtained.

Defining the line of the direction of a chief ray of the polygon-deflected beam perpendicular to the scanned surface as a reference line, a sag is asymmetrical with respect to the reference line unless no correction measures are taken. Japanese Laid-Open Patent Application No. 6-230308 discloses an approach to symmetrize the sag by configuring a scanning and imaging lens for focusing the deflected beam on the scanned surface to be asymmetrical with respect to the reference line. However, it is technically difficult and costs considerably to manufacture a scanning and imaging lens which is asymmetrical in configuration.

Japanese Laid-Open Patent Application No. 4-110818 details reducing the degree of asymmetry in curvature of field and distortion aberration by configuring a lens to have an incidence surface formed as a toroidal surface and an exit surface formed as a spherical surface, and by designing the toroidal surface and the spherical surface to be relatively shifted from each other.

While such a method is helpful to reduce the degree of asymmetry in curvature of field and distortion aberration, flexibility in correcting curvature of field suffers because the lens surfaces are formed as a normal toroidal surface and a spherical surface.

A description will now be given of another related art drawback addressed by the present invention.

Many optical scanning apparatuses are designed to operate at a high optical usage efficiency in order to achieve high-speed optical scanning. As the optical usage efficiency and the light intensity of a beam spot formed on the scanned surface become higher, a phenomenon called ghost presents a problem. A ghost occurs when the deflected beam irradiating the scanned surface to form a beam spot is reflected by the scanned surface to the polygon mirror, reflected then by the deflecting and reflecting surface of the polygon mirror and irradiating the scanned surface as a ghost beam.

SUMMARY OF THE INVENTION

Accordingly, an object of the present invention is to provide an optical scanning apparatus in which the aforementioned problems are eliminated.

Another and more specific object of the present invention is to provide an optical scanning apparatus in which adverse effects of asymmetrical sag and ghost are successfully reduced, by using a scanning and imaging element which is asymmetrical in configuration but which is comparatively easy to manufacture.

Still another object of the present invention is to provide an optical scanning apparatus in which adverse effects of asymmetrical sag are successfully reduced, by using an asymmetrical scanning and imaging lens which is easy to manufacture, and in which effects of a ghost are eliminated.

Still another object of the present invention is to provide an optical scanning apparatus in which adverse effects of asymmetrical sag and ghost are successfully reduced, by using an asymmetrical scanning and imaging lens which is easy to manufacture, and in which effects of a ghost are eliminated.

In order to attain the aforementioned objects, the present invention offers an optical scanning apparatus comprising a light source, a first optical system, a polygon mirror and a second optical system. A semiconductor laser or a light-emitting diode may be suitably used as a light source. The first optical system includes a coupling lens for coupling a beam from the first optical system. The coupling action provided by the coupling lens may be a collimating action for transforming the beam from the light source into a parallel beam or an action for transforming the beam from the light source into a slightly divergent beam or a slightly convergent beam. The polygon mirror deflects the beam from the first optical system at a constant angular velocity. The second optical system includes a scanning and imaging element for converging the beam deflected by the polygon mirror on a scanned surface so as to scan the scanned surface substantially at a constant velocity.

According to the present invention, the following conditions are satisfied.

$$\Theta/2 < \alpha < (4\pi/N) - (\Theta/2) \tag{1}$$

$$R \cdot \sin(\alpha/2) - 1.03 < h < R \cdot \sin(\alpha/2) \cdot 1.1 \tag{2}$$

where N indicates the number of deflecting and reflecting surfaces of the polygon mirror, R indicates a diameter of an inscribed circle of the polygon, $\alpha$ indicates an angle formed by a chief ray of the beam deflected by the polygon mirror so as to be perpendicular to the scanned surface and an optical axis of the first optical system, $\Theta$ indicates an angular field of view that corresponds to an effective write width on the scanned surface and h indicates a distance between a center of rotation of the polygon mirror and the optical axis of the first optical system.

The lower limit specified in condition (1) is provided so as to locate the optical axis of the first optical system outside an effective range of deflection of the beam incident on a scanning and imaging element. The upper limit specified in condition (1) is provided to ensure that the ghost beam returning the scanned surface 6 resides outside an effective write width and does not affect optical scanning within the effective write width.

Condition (2) is provided to ensure that a sag is substantially symmetrical with respect to the reference deflected chief ray in an optical arrangement specified by condition (1).

FIG. 10 shows how a sag of two beams deflected to respective ends of the effective write width is made substantially identical to each other by satisfying condition (2).

In this specification, a sag is defined as $L(\Theta) - L_0$, where $L_0$ indicates a distance between a first optical system face nearest the deflecting and reflecting surface and a point of reflection of the chief ray of the deflected beam on the deflecting and reflecting surface, occurring when the deflecting and reflecting surface is oriented such that the chief ray of the deflected beam is the reference deflected chief ray, $L(\Theta)$ indicates a distance between a first optical system face nearest the deflecting and reflecting surface and a point of reflection of the chief ray of the deflected beam on the deflecting and reflecting surface, occurring when a field angle $\Theta$ (defined as an angle within the angular field of view $\Theta$) formed by the chief ray of the deflected beam with respect to the reference deflected chief ray is not equal to 0.

Referring to FIG. 10, it is assumed that the deflecting and reflecting surface of a polygon mirror is rotated to change its orientation as illustrated. The beam exiting the first optical system and incident on the deflecting and reflecting surface at orientation i is deflected thereby to reach point $P_i$ at one end of the effective write width. The beam exiting the first optical system and incident on the deflecting and reflecting surface at orientation iii is deflected thereby to reach point $P_{iii}$ at the other end of the effective write width. The beam exiting the first optical system and incident on the deflecting and reflecting surface at orientation ii is deflected thereby to produce the reference deflected chief ray and reach point $P_{ii}$ at the center of the effective write width in the main-scanning direction.

As shown in FIG. 10, the beam incident on the deflecting and reflecting surface at orientation i travels a different distance from the beam incident on the deflecting and reflecting surface at orientation ii, producing a sag $L(\Theta)-L_0$. Also, the beam incident on the deflecting and reflecting surface at orientation iii travels a different distance from the beam incident on the deflecting and reflecting surface at orientation ii, producing a sag $L(\Theta)-L_0$. The sag produced by the beam deflected to point $P_i$ and the sag produced by the beam deflected to point $P_{iii}$ are substantially identical to each other.

Thus, the sag is symmetrized with respect to the reference deflected chief ray.

If condition (2) is not satisfied, the sag becomes significantly asymmetrical with respect to the reference deflected chief ray. If a symmetrical scanning and imaging element is used when condition (2) is not satisfied, it is difficult to correct curvature of field and constant-velocity characteristic.

Normally, an aperture for defining a beam waist is provided on an optical path from the coupling lens to the deflecting and reflecting surface of the polygon mirror.

The aforementioned objects can also be achieved by an optical scanning apparatus comprising: a light source; a first optical system which includes a coupling lens for coupling a beam from the light source;

a polygon mirror for deflecting the beam from the first optical system at a constant angular velocity; and a second optical system which includes a scanning and imaging lens for converging the beam deflected by the polygon mirror on a scanned surface so as to scan the scanned surface substantially at a constant velocity, wherein the scanning and imaging lens includes at least one lens, at least one surface of the scanning and imaging lens has a non-arcuate configuration on a plane of deflection, and at least one of lenses constituting the scanning and imaging lens is constructed such that a shift $\Delta'$ in a direction corresponding to a main-scanning direction and a tilt $\beta'$ within the plane of deflection are provided between an incidence surface and an exit surface.

According to this aspect of the present invention, at least one of the lenses constituting the scanning and imaging lens has both surfaces thereof shifted with respect to each other in the main-scanning direction (that is, the optical axes of the surfaces are displaced from each other) and/or one of the surfaces is tilted with respect to the other on the plane of deflection. Such a lens does not have symmetrical configuration overall. However, each tilted or shifted surface itself has a symmetrical configuration. For this reason, such a lens is easy to produce by employing plastic molding in which each surface of the mold is shifted or tilted. Accordingly, manufacturing of a lens according to this aspect of the invention is easy despite its overall asymmetrical configuration.

BRIEF DESCRIPTION OF THE DRAWINGS

Other objects and further features of the present invention will be apparent from the following detailed description when read in conjunction with the accompanying drawings, in which:

FIG. 4A is a graph of curvature of field produced by Example 4;

FIG. 4B is a graph of constant-velocity characteristic and linearity produced by Example 4;

FIG. 7A is a graph of curvature of field produced by Example 6;

FIG. 7B is a graph of constant-velocity characteristic and linearity produced by Example 6;

DESCRIPTION OF THE PREFERRED EMBODIMENTS

Figure 1:
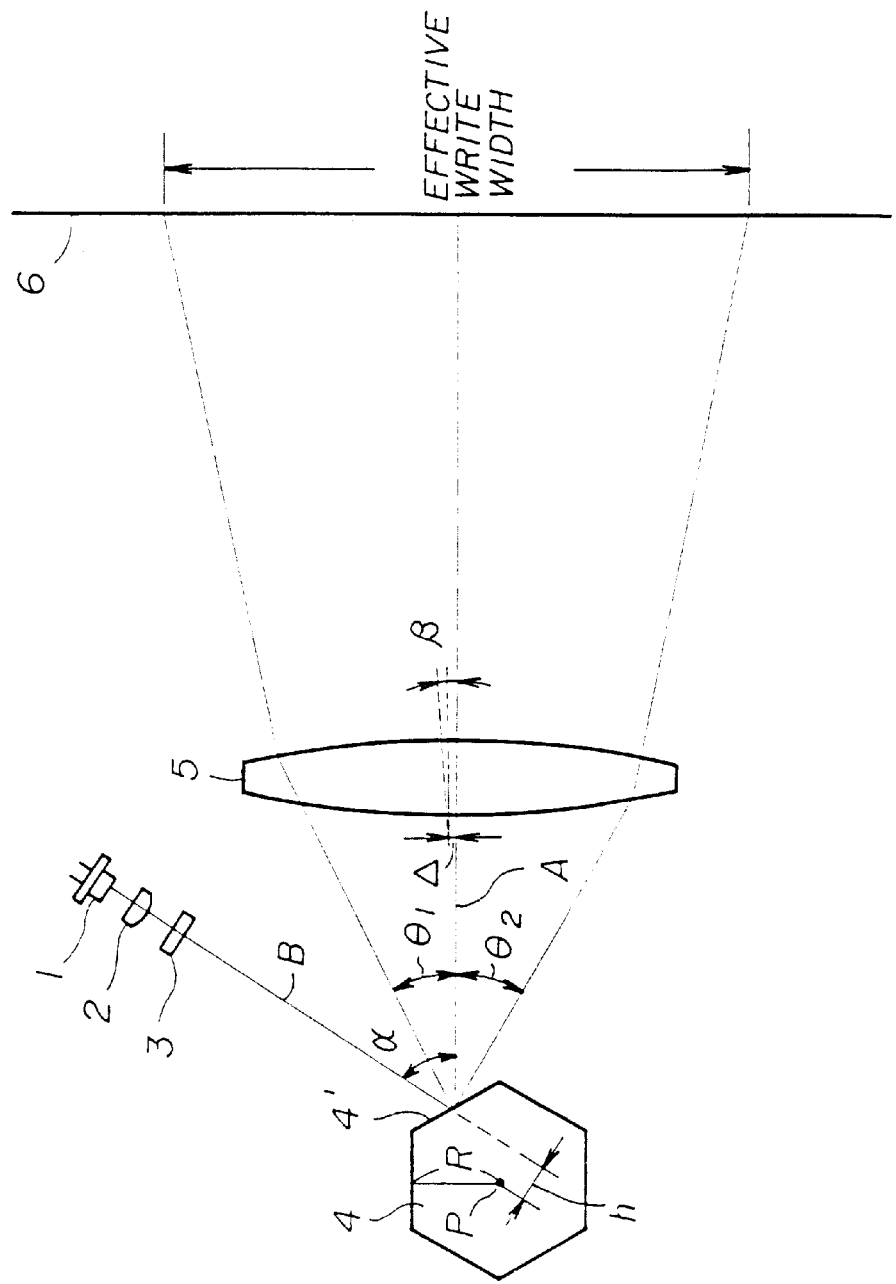
FIG. 1 illustrates an operating principle of the present invention.

FIG. 1 illustrates an operating principle of the present invention.

Referring to FIG. 1, a light beam emitted from a semiconductor laser 1 is coupled by a coupling lens 2 so as to be transformed into a parallel beam, a slightly diverging beam or a slightly converging beam. An aperture (not shown) shapes the beam by defining a beam waist. The shaped beam then passes through a cylinder lens 3 constituting a first optical system together with the coupling lens 2. The cylinder lens 3 acts to converge the beam in a direction (hereinafter, referred to as an unfolded sub-scanning direction) normal to the paper and parallel with the sub-scanning direction when an optical path from the light source to a scanned surface 6 is unfolded or straightened. The beam is focused by the cylinder lens 3 so as to form an image elongated in a direction (hereinafter, referred to as an unfolded main-scanning direction) parallel with the main-scanning direction when an optical path from the light source to the scanned surface 6 is unfolded or straightened, in the neighborhood of a deflecting and reflecting surface 4' of a polygon mirror 4.

The beam is deflected by the deflecting and reflecting surface 4' of the polygon mirror 4 at a constant angular velocity as the polygon mirror 4 rotates at a constant revolution. The deflected beam is incident on a scanning and imaging lens 5 (scanning and imaging element) of a single-lens construction. The scanning and imaging lens 5 constitutes a second optical system. The scanning and imaging lens 5 converges the deflected beam so as to form a beam spot for scanning the scanned surface 6 at a substantially constant velocity. The scanning and imaging lens 5 functions to place the deflecting and reflecting surface 4' of the polygon mirror 4 and the scanned surface 6 in a conjugated arrangement. Accordingly, the optical scanning apparatus shown in FIG. 1 is provided with a facet-inclination correction function. Since a photosensitive body having a photo conductivity is provided such that its periphery constitutes the scanned surface 6, the beam spot substantially scans the photosensitive body.

The polygon mirror 4 is a cylinder with a polygon cross section constructed such that the following conditions are satisfied.

$$\Theta/2 < \alpha < (4\pi/N) - (\Theta/2) \qquad (1)$$

$$R \cdot \sin(\alpha/2) \cdot 1.03 < h < R \cdot \sin(\alpha/2) \cdot 1.1 \qquad (2)$$

where N indicates the number of deflecting and reflecting surfaces of the polygon mirror, R indicates a diameter of an inscribed circle of the polygon, α indicates an angle formed by a chief ray of the beam deflected by the polygon mirror 4 so as to be perpendicular to the scanned surface 6 (hereinafter, this chief ray will be referred to as a reference deflected chief ray A) and an optical axis B of the first optical system, $\Theta$ $(=\Theta_1+\Theta_2)$ indicates an angular field of view that corresponds to an effective write width on the scanned surface 6 and h indicates a distance between a center of rotation P of the polygon mirror 4 and the optical axis B of the first optical system.

If α is below the lower limit of condition (1), the optical axis B of the first optical system is located within the angular field of view Θ. If α exceeds the upper limit of condition (1), the ghost beam reflected by the scanned surface 6 is reflected a second time by the deflecting and reflecting surface 4' so as to irradiate the effective write width.

As shown in FIG. 1, given that the chief ray of the deflected beam from the polygon mirror 4 located at an end of the angular field of view Θ forms an angle $\Theta_1$ with respect to the direction perpendicular to the scanned surface 6 and that the chief ray of the deflected beam located at the other end of the angular field of view e forms an angle $\Theta_2$ with respect to the direction perpendicular to the scanned surface 6, the angles $\Theta_1$ and $\Theta_2$ ($\Theta=\Theta_1+\Theta_2$) could be such that $\Theta_1=\Theta_2$ or $\Theta_1 \ne \Theta_2$.

Referring to FIG. 1, a shift Δ in the main-scanning direction and/or a tilt β in a plane of deflection may be provided to the scanning and imaging lens 5. A plane of deflection is defined as a plane swept by a chief ray of the beam deflected ideally by the polygon mirror.

The shift Δ is defined as displacement of the scanning and imaging lens 5, placed such that its optical axis is parallel with the reference deflecting chief ray A, in the main-scanning direction (the direction perpendicular to the reference deflected chief ray A in FIG. 1) away from the reference deflected chief ray A. Referring to FIG. 1, the shift Δ is defined to be positive in the direction of the top of the paper.

The tilt β of the scanning and imaging lens 5 is defined as a tilt of its optical axis within a plane of deflection (the plane of the paper) with respect to the reference deflected chief ray A. Referring to FIG. 1, the tilt β is defined to be positive in the counterclockwise direction.

Figure 11:
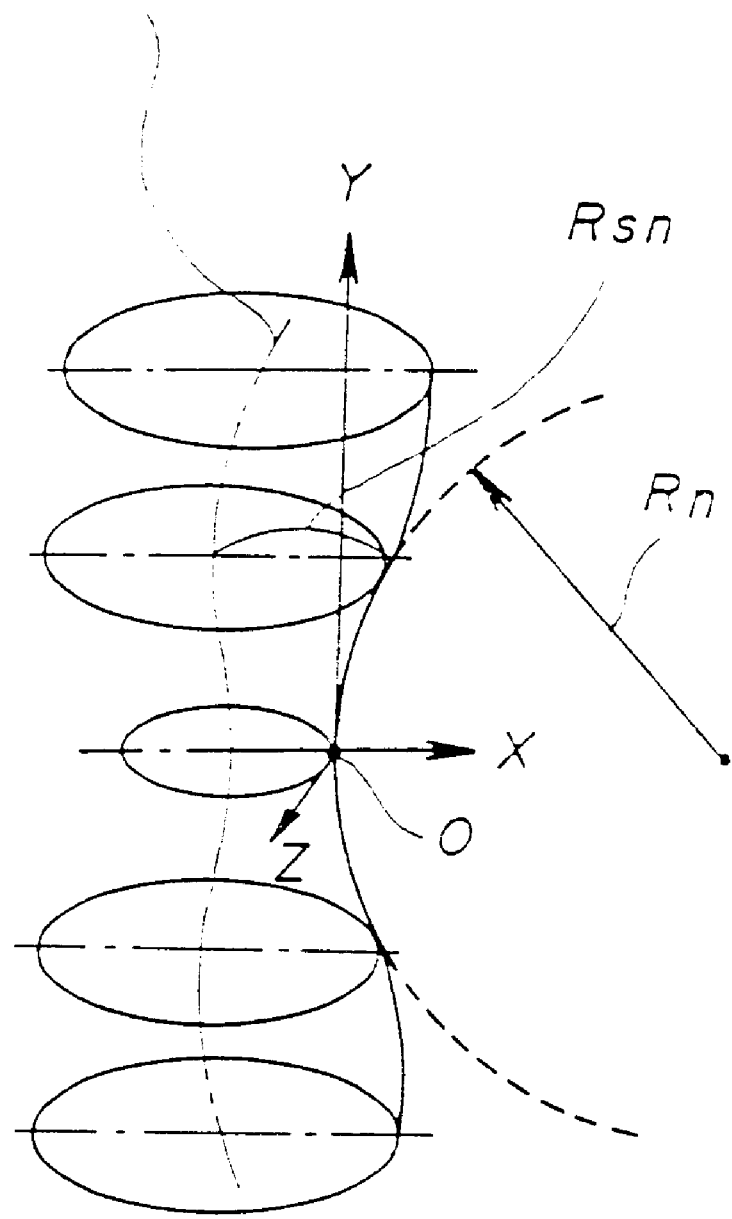
FIG. 11 shows how a special toric surface is formed.

The scanning and imaging lens 5 may have at least one surface thereof formed as a special toric surface wherein a line connecting, on a plane of deflection, centers of curvature of the surface occurring on a plane perpendicular to the plane of deflection, is not straight (see FIG. 11). An ordinary toric surface may be used instead of a special toric surface.

The scanning and imaging lens 5 of a single-lens construction may be formed by plastic molding at a relatively low cost.

In case the scanning and imaging element constituting the second optical system is composed of two or more optical elements, for example, of two or more lenses or mirrors, instead of the scanning and imaging lens 5, at least one of the constituent elements may be provided with a shift and/or a tilt.

The scanning and imaging element may be implemented by a concave mirror having image-forming capability, instead of the scanning and imaging lens 5.

In addition to the scanning and imaging element, the second optical system may include a mirror for bending an optical path, or an elongated lens or mirror for facet inclination correction.

A description will now be given of specific examples of the optical scanning apparatus according to the present invention.

EXAMPLE 1

Referring to FIG. 1, the optical scanning apparatus could be constructed such that N=6, R=18 mm, α=60°, Θ=80° and $\Theta_1=\Theta_2=40°$. Condition (1) is satisfied such that 40°(=Θ/2) <60°(=α)<80° (=4π/N−Θ/2).

A parameter k is provided such that h R·sin(α/2)·k. Calculations are done to determine h, the sag for the deflected beam angled at $\Theta_1=40°$ and the sag for the deflected beam angled at $\Theta_2=40°$, at k values of 1.033, 1.067 and 1.089. The following is the results of the calculations.

| k | h | sag (at $\theta_1 = 40°$) | sag (at $\theta_2 = 40°$) |
|---|---|---|---|
| 1.033 | 9.3 | −1.22 mm | −1.50 mm |
| 1.067 | 9.6 | −1.34 mm | −1.32 mm |
| 1.089 | 9.8 | −1.42 mm | −1.20 mm |

As indicated by the table above, when conditions (1) and (2) are both satisfied, the magnitude of the sag is substantially identical for the deflected beam directed to an end of the effective write width and for the deflected beam directed to the other end of the effective write width. In other words, the sag is substantially symmetrical with respect to the reference deflected chief ray A. Even if the scanning and imaging element constituting the second optical system is implemented by an optical system with a configuration symmetrical in the unfolded main-scanning direction, adverse effects of sag on curvature of field, constant velocity characteristic and facet inclination can be easily corrected by controlling a shift or a tilt, because these effects of sag occur substantially symmetrically in the unfolded main-scanning direction with respect to the reference deflected chief ray.

Adverse effects of ghost can be successfully eliminated by satisfying condition (1) at an angular field of view of Θ of 88°.

EXAMPLE 2

Referring to FIG. 1, the optical scanning apparatus could be constructed such that, N=4, R=6 mm, α=90°, Θ=80° and $\Theta_1=\Theta_2=40°$. Condition (1) is satisfied such that 40° (=Θ/2) <90° (=α)<140° (=4π/N−Θ/2).

A parameter k is provided such that h=R·sin(α/2)·k. Calculations are done to determine h, the sag for the deflected beam angled at $\Theta_1=40°$ and the sag for the deflected beam angled at $\Theta_2=40°$, at k values of 1.047, 1.071 and 1.094.

| k | h | sag (at $\theta_1 = 40°$) | sag (at $\theta_2 = 40°$) |
|---|---|---|---|
| 1.047 | 4.443 | −0.51 mm | −0.63 mm |
| 1.071 | 4.543 | −0.56 mm | −0.51 mm |
| 1.094 | 4.643 | −0.61 mm | −0.40 mm |

As indicated by the table above, when conditions (1) and (2) are both satisfied, the magnitude of the sag is substantially identical for the deflected beam directed to an end of the effective write width and for the deflected beam directed to the other end of the effective write width. In other words, the sag is substantially symmetrical with respect to the reference deflected chief ray A. Even if the scanning and imaging element constituting the second optical system is implemented by an optical system with a configuration symmetrical in the unfolded main-scanning direction, adverse effects of sag on curvature of field, constant velocity characteristic and facet inclination can be easily corrected by controlling a shift or a tilt, because these effects of sag occur substantially symmetrically in the unfolded main-scanning direction with respect to the reference deflected chief ray.

As the lateral magnification M of the scanning and imaging element in the unfolded sub-scanning direction becomes greater, correction of curvature of field, constant velocity characteristic and facet inclination is facilitated. When M>1 and when condition (2) is not satisfied, curvature of field and constant velocity characteristic become significantly unfavorable. While curvature of field can be corrected by using a scanning and imaging element having a configuration asymmetrical in the main-scanning direction, facet inclination cannot be properly corrected if the sag becomes great.

A description will now be given of various examples of optical scanning apparatuses where the light beam from the light source 1 is slightly converged by the coupling lens 2.

It is assumed that the cylinder lens 3 is constructed to have a thickness of $d_1$, a refractive index of $n_1$ at the operating frequency, and the incidence surface has a radius of curvature of $r_{1S}$ in the unfolded sub-scanning direction and the exit surface has a radius of curvature of $r_2$ in the unfolded sub-scanning direction. The distance between the cylinder lens 3 and the point of deflection for the reference deflected chief ray A is indicated by $d_2$, the distance between the point of deflection and the incidence lens surface of the scanning and imaging lens 5 is indicated by $d_3$, the thickness of the scanning and imaging lens 5 is indicated by $d_4$, the refractive index of the scanning and imaging lens 5 at the operating frequency is indicated by $n_2$, the distance between the exit surface of the scanning and imaging lens 5 and the scanned surface 6 is indicated by $d_5$, and the distance between the plane of deflection and the point of natural convergence of the deflected beam in the unfolded main-scanning direction is indicated by S. The point of natural convergence is defined as a point at which the beam slightly converged by the coupling lens 2 is converged in the main-scanning direction in the absence of the scanning and imaging lens 5. In the following description, the magnitude of length is assumed to be mm.

Both sides of the scanning and imaging lens 5 have a non-arcuate outline on the plane of deflection (that is, in the unfolded main-scanning direction) such that $$X=Y^2/[R_n+R_n\sqrt{1-(1+K_n)Y^2/R_n^2}]+A_nY^4+B_nY^6+C_nY^8+D_nY^{10}+ \quad (3)$$

where X indicates a coordinate in the direction of the optical axis, Y indicates a coordinate in the direction perpendicular to the optical axis (unfolded main-scanning direction), $R_n$ indicates a paraxial radius of curvature, $K_n$ indicates a constant of the cone, $A_n$, $B_n$, $C_n$ and $D_n$ indicate high-order coefficients (n=1 for the incidence surface and n=2 for the exit surface). The configuration is defined by determining $A_n$, $B_n$, $C_n$ and $D_n$.

Both sides of the scanning and imaging lens 5 have a special toric surface. The radius of curvature $R_{Sn}$ on the plane perpendicular to the plane of deflection (radius of curvature in the unfolded sub-scanning direction) at a position Y from the optical axis in the unfolded main-scanning direction is given by $$R_{Sn}=R_{S0n}+a_nY^2+b_nY^4+c_nY^6+d_nY^8+e_nY^{10}+f_nY^{12}+g_nY^{14}+ \quad (4)$$

where n=1 for the incidence surface and n=2 for the exit surface. The configuration is defined by determining $R_{S0n}$, $a_n$, $b_n$, . . . .

EXAMPLE 3

A description will now be given of Example 3 of the construction of the optical scanning apparatus of the present invention.

In Example 3, $d_1$=3.0, $n_1$=1.51933, $r_{1S}$=44.68 (cylinder surface), $r_2$=∞, $d_2$=70.0, $d_3$=48.1, $d_4$=20.0, $n_2$=1.51933, $d_5$=106.9, and S=311.1.

The configuration of the scanning and imaging lens 5 on the plane of deflection is such that

| n | $R_n$ | $K_n$ | $A_n$ | $B_n$ | $C_n$ | $D_n$ |
|---|---|---|---|---|---|---|
| 1 | 199.5 | −35.1384 | −1.9846E-7 | 2.1692E-11 | 1.9018E-15 | −1.88E-19 |
| 2 | −212.0 | 2.106 | −3.709E-7 | 1.7132E-11 | −5.93E-15 | 1.494E-18 |

The configuration on the plane perpendicular to the plane of deflection is such that

| n | $R_{S0n}$ | $a_n$ | $b_n$ | $c_n$ | $d_n$ | $e_n$ | $f_n$ | $g_n$ |
|---|---|---|---|---|---|---|---|---|
| 1 | −40.03 | −1.19E-2 | 1.678E-5 | −1.7646E-8 | 9.9902E-12 | −2.8335E-15 | 3.154E-19 | 0.0 |
| 2 | −15.973 | −8.58E-4 | 2.072E-2 | 1.505E-9 | −1.77196E-12 | 9.1971E-16 | −2.28E-19 | 2.18171E-23 |

In the above tables, the alphabet E and the subsequent numeral indicate a power of 10. For example, E-2 indicates $10^{-2}$. That is, the number preceding this notation is raised to the −2th power of 10.

Example 3 is constructed such that N=6, R=18, α=60°, $\Theta_1$=44.2° and $\Theta_2$=45.7°. Therefore, the angular field of view is such that $\Theta$=$\Theta_1$+$\Theta_2$=89.9°. Also, h=9.6=R-sin(α/2)-1.067. Therefore, conditions (1) and (2) are both satisfied. The scanning and imaging lens 5 is provided with a shift Δ of +0.7 and a tilt β of −0.64°.

Figure 2A:
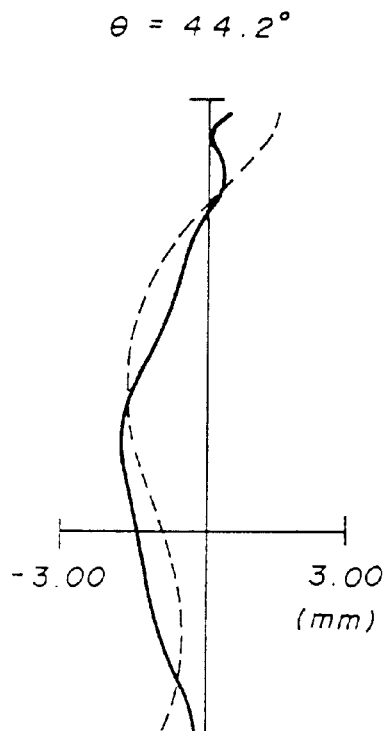
FIG. 2A is a graph of curvature of field produced by Example 3 of the optical scanning apparatus according to the present invention.
Figure 2B:
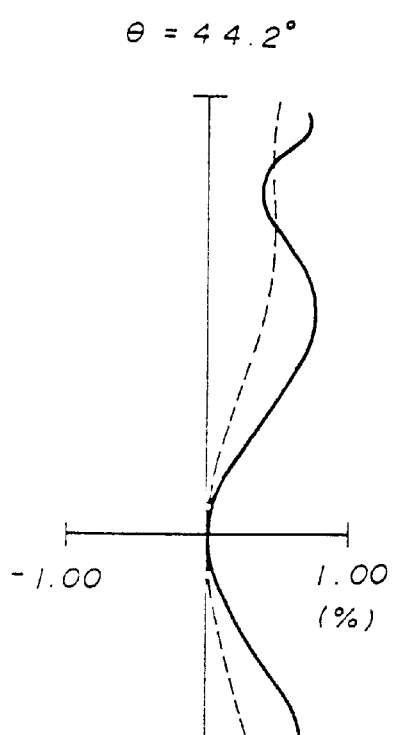
FIG. 2B is a graph of constant-velocity characteristic and linearity produced by Example 3.

The scanning and imaging lens 5 has a configuration symmetrical with respect to the optical axis, that is, in the unfolded main-scanning direction. As shown in FIG. 2A, curvature of field in the main-scanning direction (indicated by the broken line) and curvature of field in the sub-scanning direction (indicated by the solid line) are favorably corrected. As shown in FIG. 2B, constant-velocity characteristic (as calculated according to an equation for fΘ characteristic) and linearity are properly corrected, the broken line indicating constant-velocity characteristic and the solid line indicating linearity.

Figure 3A:
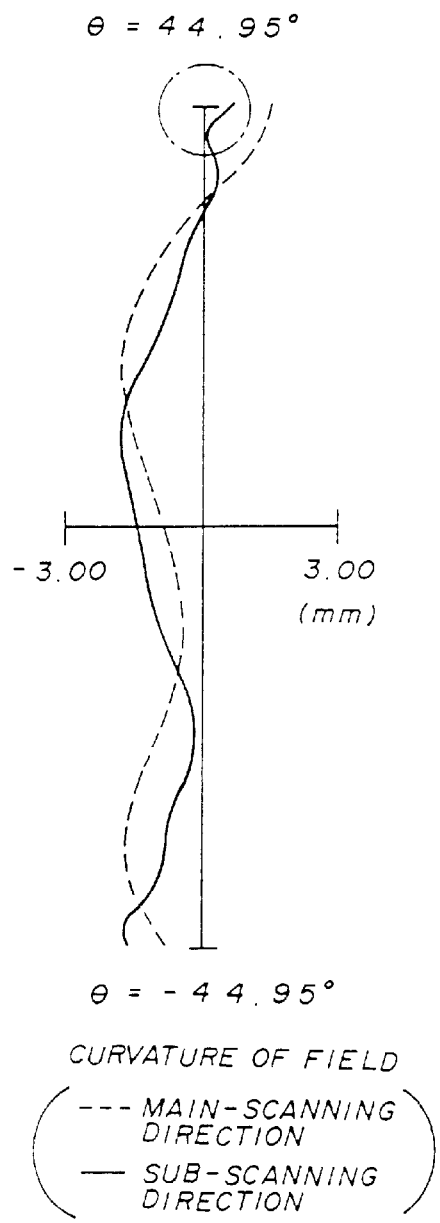
FIG. 3A is a graph of curvature of field produced by a related variation of Example 3.
Figure 3B:
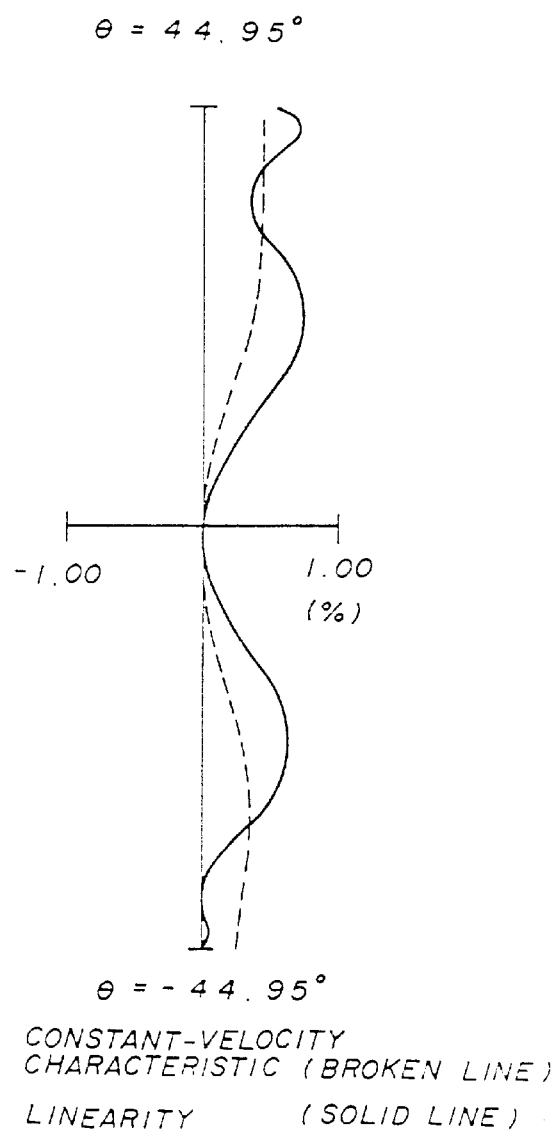
FIG. 3B is a graph of constant-velocity characteristic and linearity produced by the related variation of Example 3.

In a related variation of Example 3, the angular field of view could be such that $\Theta$=89.9° ($\Theta_1$=$\Theta_2$=44.95°). According to this variation, curvature of field in the main scanning direction and curvature of field in the sub-scanning direction are as shown in FIG. 3A. Constant-velocity characteristic and linearity are as shown in FIG. 3B. While FIGS. 2A and 2B and FIGS. 3A and 3B show that Example 3 and its related variation produce substantially the same result, curvature of field in the sub-scanning direction at the start of scanning (indicated by a numeral 3-1 in FIG. 3A) drops from 2.17 mm (FIG. 2A) to 2.42 mm (FIG. 3A). This shows that by configuring the angles $\Theta_1$ and $\Theta_2$ such that $\Theta_1 \neq \Theta_2$, curvature of field is reduced.

Referring to FIG. 1, the chief ray of the deflected beam angled at $\Theta_1$=44.2° crosses the incidence surface of the scanning and imaging lens 5 at a distance of 50.65 mm from the reference deflected chief ray A in the unfolded main-scanning direction and crosses the exit surface at a distance of 53.73 mm. The chief ray of the deflected angled at $\Theta_2$=45.7° crosses the incidence surface of the scanning and imaging lens 5 at a distance of 50.79 mm and crosses the exit surface at a distance of 53.63 mm. If $\Theta_1$=$\Theta_2$=44.95°, the chief ray of the beam deflected toward the top of the paper crosses the incidence surface at a height of 49.33 mm and crosses the exit surface at a height of 52.55 mm. The chief ray of the beam deflected toward the bottom of the paper crosses the incidence surface at a height of 52.29 mm and crosses the exit surface at a height of 54.94 mm. This shows that the size of the scanning and imaging lens can be reduced by configuring the angles $\Theta_1$ and $\Theta_2$ such that $\Theta_1 \neq \Theta_2$ and by controlling the difference between $\Theta_1$ and $\Theta_2$ depending on the shift and the tilt of the scanning and imaging lens 5.

EXAMPLE 4

A description will now be given of Example 4 of the construction of the optical scanning apparatus of the present invention.

In Example 4, $d_1$=3.0, $n_1$=1.51933, $r_{1S}$=13.81 (cylinder surface), $r_2$=∞, $d_2$=25.0, $d_3$=33.1, $d_4$=13.5, $n_2$=1.51933, $d_5$=128.4, and S=1372.8.

The configuration of the scanning and imaging lens 5 on the plane of deflection is such that

| n | $R_n$ | $K_n$ | $A_n$ | $B_n$ | $C_n$ | $D_n$ |
|---|---|---|---|---|---|---|
| 1 | 160.325 | −58.38 | −9.22923E-7 | 3.65515E-10 | −8.34355E-14 | 1.113E-17 |
| 2 | −139.26 | 4.83 | −9.71348E-7 | 2.37E-10 | −8.06014E-14 | 2.65E-17 |

The configuration on the plane perpendicular to the plane of deflection is such that

| n | $R_{S0n}$ | $a_n$ | $b_n$ | $c_n$ | $d_n$ | $e_n$ | $f_n$ |
|---|---|---|---|---|---|---|---|
| 1 | −108.6 | 7.803E-2 | −3.15051E-4 | 8.16834E-7 | −1.10138E-9 | 7.352E-13 | −1.8802E-16 |
| 2 | −15.2 | −1.6873E-3 | 3.41942E-6 | −4.2899E-9 | 5.634E-12 | −4.189E-15 | 1.2966E-18 |

Example 4 is constructed such that N=6, R=18, α=60°, $\Theta_1$=43.6° and $\Theta_2$=44.4°. Therefore, the angular field of view is such that $\Theta=\Theta_1+\Theta_2$=88°. Also, h=9.35=R·sin(α/2)·1.039. Therefore, conditions (1) and (2) are both satisfied. The scanning and imaging lens 5 is provided with a shift Δ of +0.80 and a tilt β of 0.140.

The scanning and imaging lens 5 has a configuration symmetrical with respect to the optical axis, that is, in the unfolded main-scanning direction. As shown in FIG. 4A, curvature of field in the main-scanning direction and curvature of field in the sub-scanning direction are favorably corrected. Also, as shown in FIG. 4B, constant-velocity characteristic and linearity are favorably corrected.

It is assumed that the width, in the unfolded main-scanning direction, of the beam exiting the first optical system and incident on the polygon mirror 12 is 2 mm, and that the unintended chamfering of the deflecting and reflecting surface of the polygon mirror 12 is 0.2 mm. Conventionally, the angles of deflection $\Theta_1$ and $\Theta_2$ are configured to be as close to each other as possible so that the deflected beam is not eclipsed by the polygon mirror. Further, the angular field of view Θ is configured to be as large as possible. According to such a conventional arrangement, the relationship h=10.35=R·sin(α/2)·1.15 holds so that condition (2) is not satisfied and the sag becomes asymmetrical.

Figure 5A:
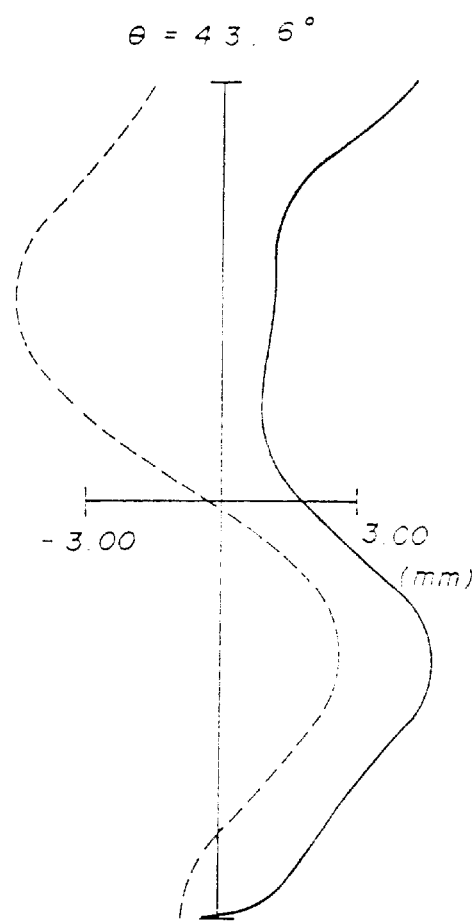
FIG. 5A is a graph of curvature of field produced by a related variation of Example 4.
Figure 5B:
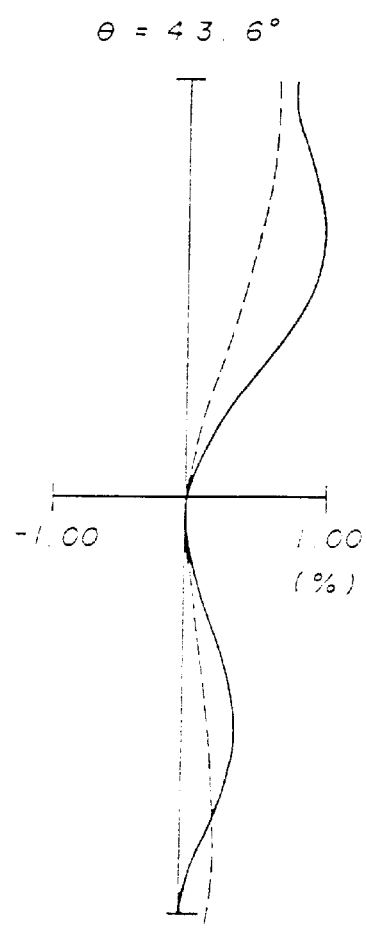
FIG. 5B is a graph of constant-velocity characteristic and linearity produced by the related variation of Example 4.

If Example 4 is configured according one variation such that h=10.2=R·sin(α/2)·1.13, Δ=+1.39 and β=0.140, the characteristics shown in FIGS. 5A and 5B result. As shown in FIG. 5A, curvature of field in the main-scanning direction and in the sub-scanning direction is enlarged.

EXAMPLE 5

A description will now be given of Example 5 of the construction of the optical scanning apparatus according to the present invention.

Figure 6A:
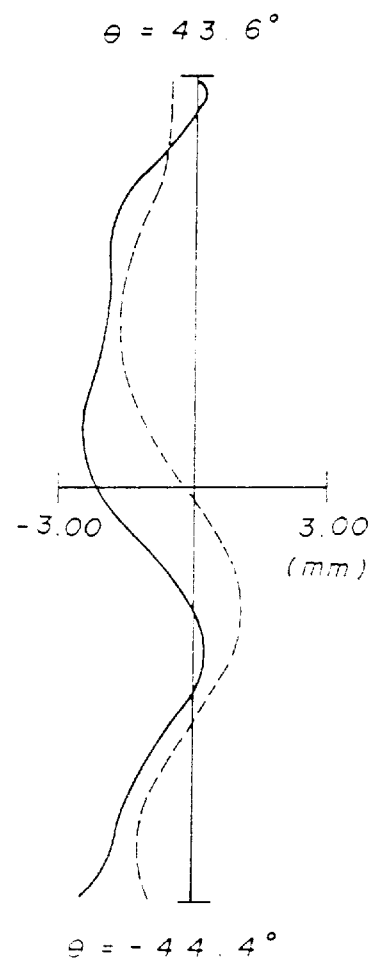
FIG. 6A is a graph of curvature of field produced by Example 5.
Figure 6B:
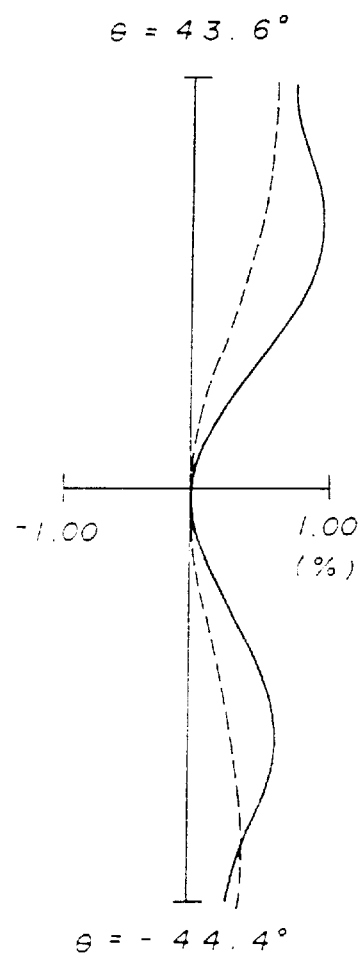
FIG. 6B is a graph of constant-velocity characteristic and linearity produced by Example 5.

Example 5 is obtained by modifying Example 4. The shift Δ of the scanning and imaging lens 5 is changed from +0.80 to +0.74, and the tilt β thereof is changed from 0.14° to 0° (no tilt). As shown in FIGS. 6A and 6B, curvature of field, constant-velocity characteristic and linearity are favorably corrected.

EXAMPLE 6

A description will now be given of Example 6 of the construction of the optical scanning apparatus according to the present invention.

Example 6 is obtained by modifying Example 3. The shift Δ of the scanning and imaging lens 5 is changed from +0.7 to 0 (no shift), and the tilt β is changed from −0.64° to −0.2°. As shown in FIGS. 7A and 7B, curvature of field, constant-velocity characteristic and linearity are favorably corrected.

EXAMPLE 7

A description will now be given of Example 7 of the construction of the optical scanning apparatus according to the present invention.

Figure 8A:
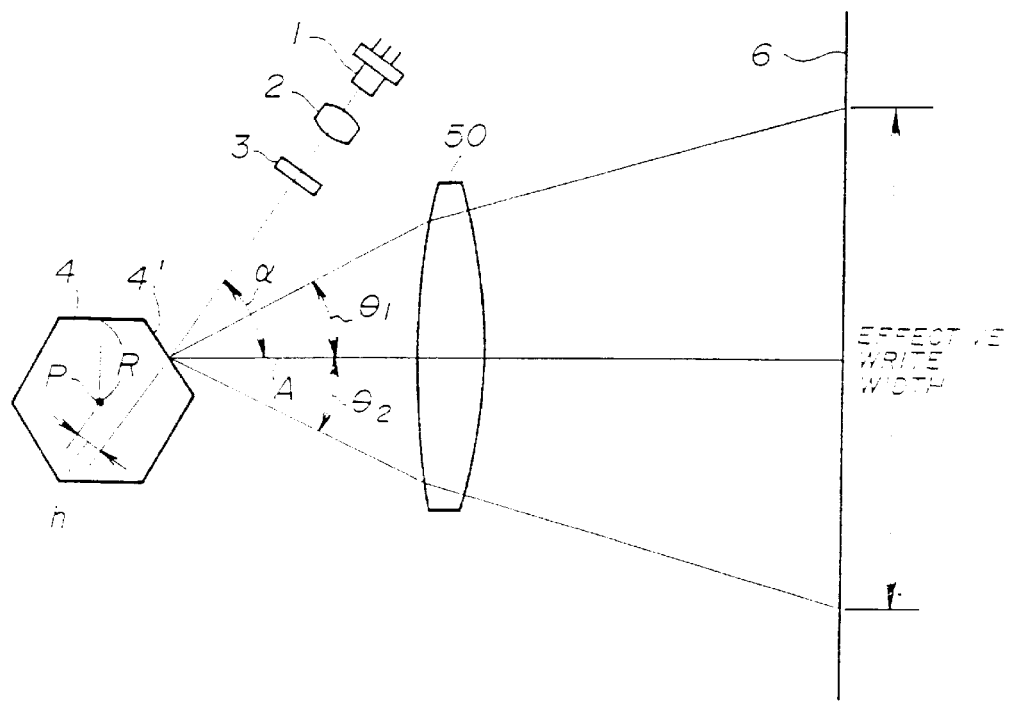
FIG. 8A shows an optical scanning apparatus according to Example 7.

FIG. 8A shows an optical scanning apparatus according to Example 7. In FIGS. 1 and 8A, like components are designated by like numerals, and the description thereof is omitted. Conditions (1) and (2) applied to the construction of FIG. 1 also apply to the construction of FIG. 8A.

Figure 8B:
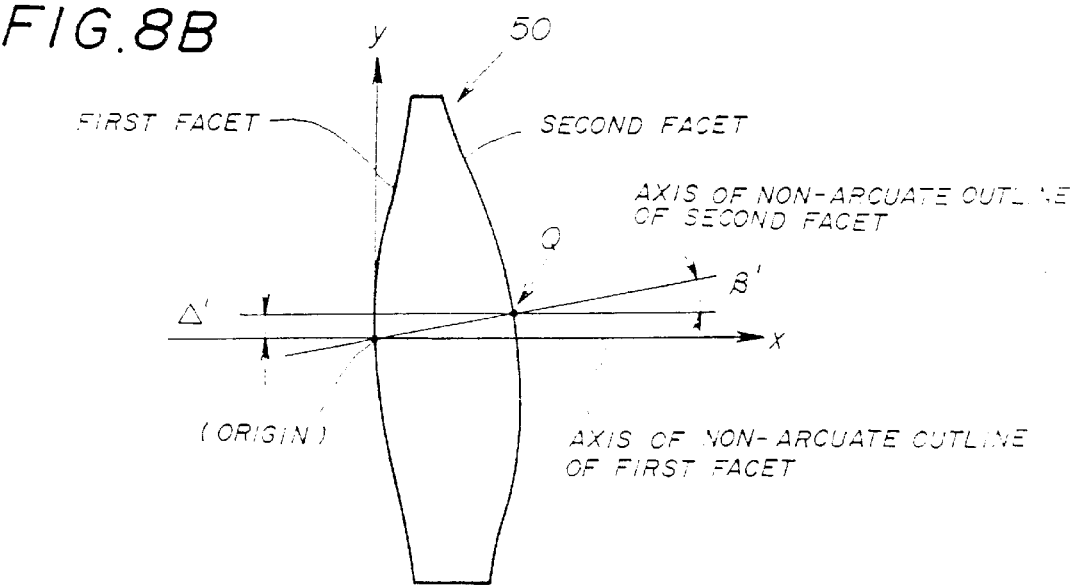
FIG. 8B shows a scanning and imaging lens having a single-lens construction and constituting a feature of the optical scanning apparatus of FIG. 8A.

FIG. 8B shows a scanning and imaging lens 50 (second optical system) having a single-lens construction and constituting an important feature of the optical scanning apparatus of FIG. 8A.

Referring to FIG. 8B, an x-y plane indicates a plane of deflection, where the y direction is the unfolded main-scanning direction. A first facet (incidence surface: the surface facing the polygon mirror 4) and a second facet (exit surface: the surface facing the scanned surface 6) of the scanning and imaging lens 5 are both configured to be non-arcuate on the plane of deflection.

Referring to FIG. 8B, the x axis coincides with the axis of symmetry of the non-arcuate first facet. When the axis of symmetry of the non-arcuate second facet forms an angle β' with respect to the x axis, the first facet and the second facet are said to be relatively tilted at an angle β' within the plane of deflection. Like the aforementioned "tilt" of the lens itself, the relative tilt of lens facets is defined to be positive in the counterclockwise direction.

When a point Q at which the axis of the non-arcuate second facet is displaced from the x axis by a distance Δ', the second facet is said to have a shift Δ'. Like the aforementioned "shift" of the lens itself, the relative shifts of lens facets is defined to be positive in the direction of the top of the paper of FIG. 8A.

FIG. 8B shows the scanning and imaging lens 5 in which both a shift and a tilt are provided to the second surface relative to the first surface.

Figure 12:
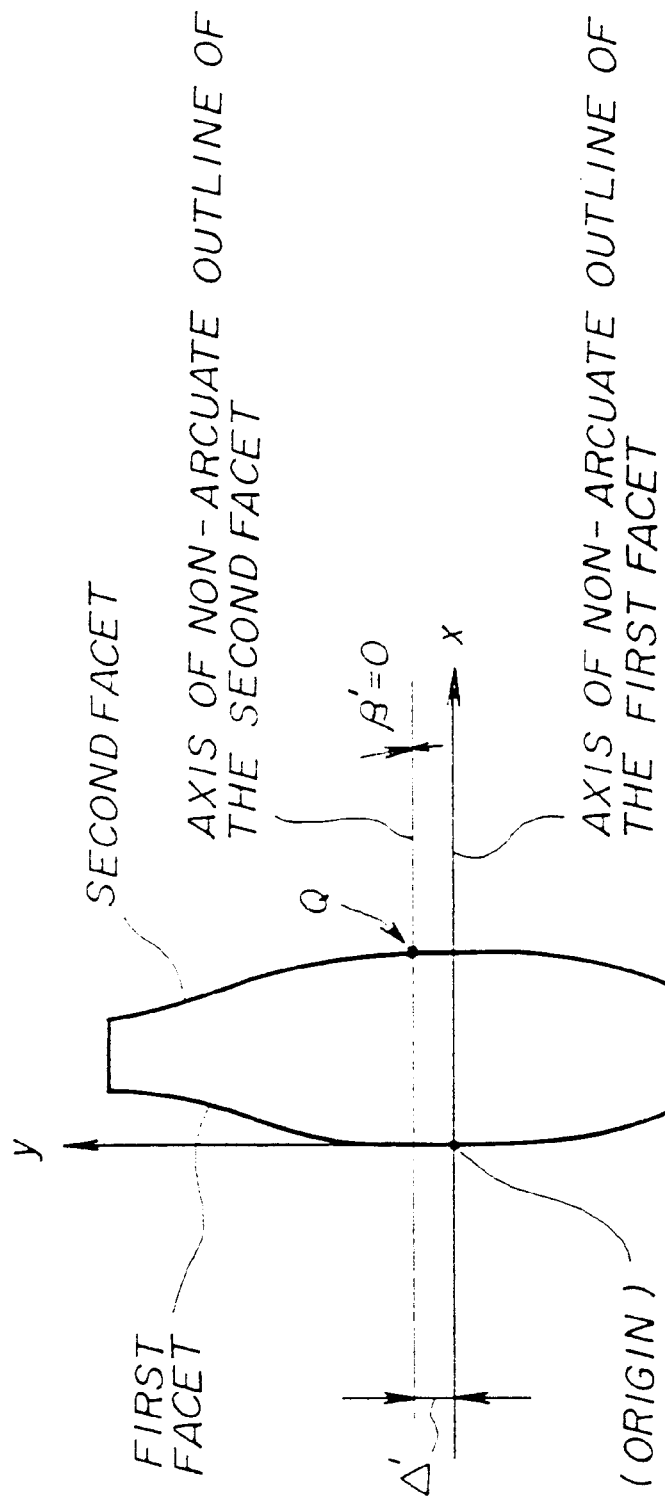
FIG. 12 shows how a shift is provided to the second surface of the scanning and imaging lens relative to the first surface.

FIG. 12 shows the scanning and imaging lens 5 in which only a shift Δ' is provided to the second surface relative to the first surface.

Figure 13:
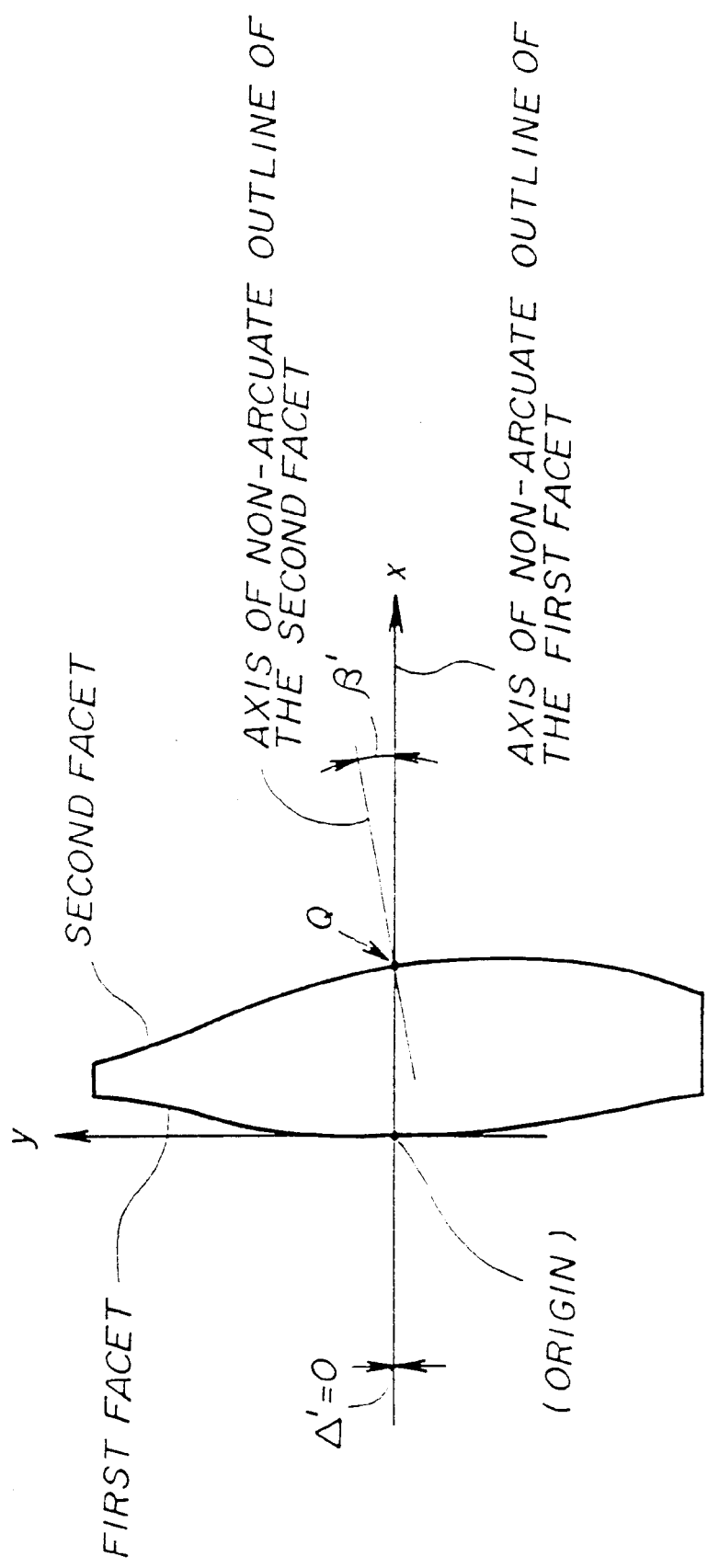
FIG. 13 shows how a tilt is provided to the second surface of the scanning and imaging lens relative to the first surface.

FIG. 13 shows the scanning and imaging lens 5 in which only a tilt β' is provided to the second surface relative to the first surface.

Referring to FIG. 8A, the light beam from the light source 1 is slightly converged by the coupling lens 2.

In Example 7, $d_1$, $n_1$, $r_{1S}$, $r_2$, $d_2$, $d_3$, $d_4$ (thickness at the center of the scanning and imaging lens 50), $n_2$ (refractive index of the scanning and imaging lens 50 at the operating frequency), $d_5$ and S are defined as in Examples 3–6. The configuration, on the plane of deflection, of the first surface (incidence surface) and the second surface (exit surface) of the scanning and imaging lens 50 is defined according to the equation (3). The configuration in the unfolded sub-scanning direction is defined according to the equation (4).

Example 7 is constructed such that $d_1$=3.0, $n_1$=1.51933, $r_{1S}$=13.83 (cylinder surface), $r_2$=∞, $d_2$=25.0, $d_3$=32.4, $d_4$=14.5, $n_2$=1.49205, $d_5$=128.1, and S=1194.4.

The configuration of the scanning and imaging lens 5 on the plane of deflection is such that

| n | $R_n$ | $K_n$ | $A_n$ | $B_n$ | $C_n$ | $D_n$ |
|---|---|---|---|---|---|---|
| 1 | 160.521 | −35.157 | −1.14699E-6 | 3.96489E-10 | −1.86559E-14 | −9.15608E-19 |
| 2 | −126.049 | 4.33282 | −5.80254E-7 | −8.70609E-11 | 4.85965E-14 | 2.13582E-17 |

The configuration on the plane perpendicular to the plane of deflection is such that

| n | $R_{S0n}$ | $a_n$ | $b_n$ | $c_n$ | $d_n$ | $e_n$ | $f_n$ |
|---|---|---|---|---|---|---|---|
| 1 | −95 | 0.0 | 0.0 | 0.0 | 0.0 | 0.0 | 0.0 |
| 2 | −14.41 | −1.947E-3 | 4.707E-6 | −8.093E-9 | 1.0671E-11 | −7.2296E-15 | 1.875E-18 |

As indicated above, the first surface (incidence surface) is a special toric surface which is non-arcuate on the plane of deflection. The second surface (exit surface) is a special toric surface which is non-arcuate on the plane of deflection.

Example 7 is constructed such that N=6, R=18, $\alpha=60°$, $\Theta_1=\Theta_2=44°$ so that the angular field of view is such that $\Theta=\Theta_1+\Theta_2=88°$. Further, $h=9.55=R \cdot \sin(\alpha/2) \cdot 1.061$ so that conditions (1) and (2) are both satisfied.

The axis of the non-arcuate configuration (x axis in FIG. 8A) of the first surface of the scanning and imaging lens 50 coincides with the reference deflected chief ray A. The second surface is provided with a shift and a tilt relative to the first surface such that $\Delta'=+0.4$ and $\beta'=+0.5°$.

Figure 9A:
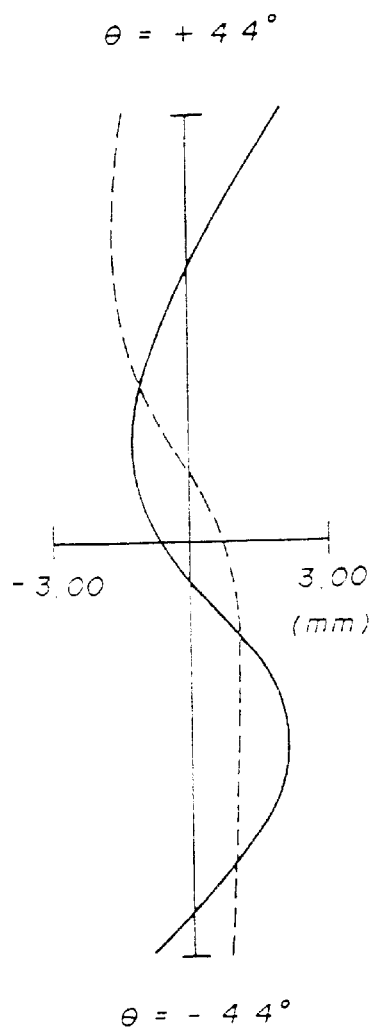
FIG. 9A is a graph of curvature of field produced by Example 7.
Figure 9B:
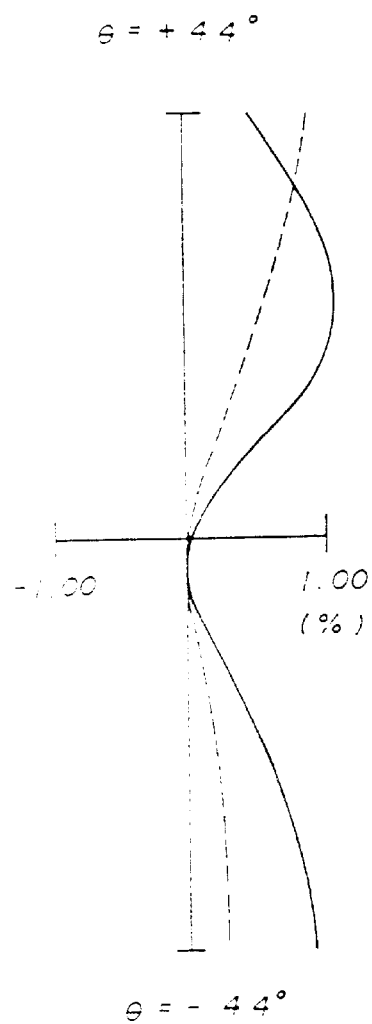
FIG. 9B is a graph of constant-velocity characteristic and linearity produced by Example 7.
Figure 10:
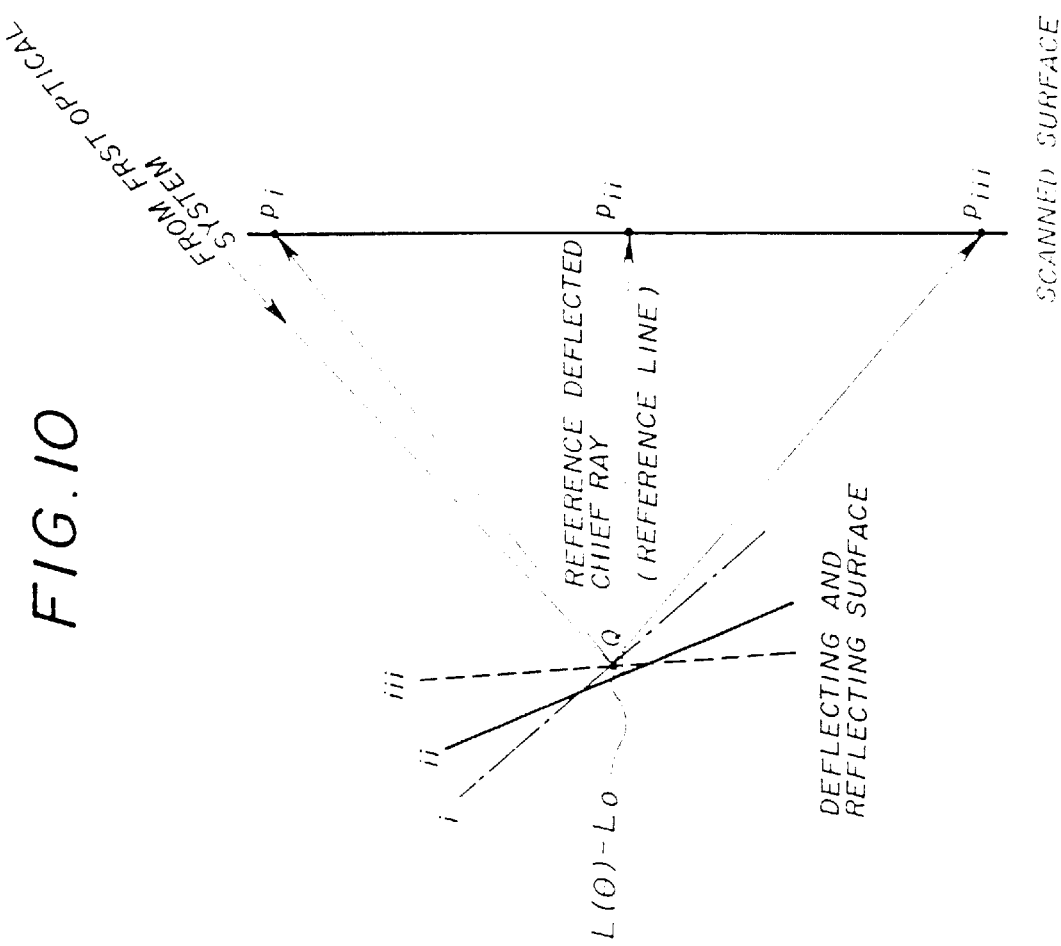
FIG. 10 shows how a sag of two beams deflected to respective ends of the effective write width is made substantially identical to each other by satisfying a predetermined condition according to the present invention.

FIGS. 9A shows curvature of field in the main-scanning direction and in the sub-scanning direction according to Example 7. FIG. 9B shows constant-velocity characteristic and linearity according to Example 7.

Characteristics are favorable such that curvature of field in the main-scanning direction is 2.34 mm, curvature of field in the sub-scanning direction is 3.10 mm and linearity is 0.93%.

While the non-arcuate configuration is defined according to the equation (3) and the special toric surface is defined according to the equation (4), analytic representations other than the equations (3) and (4) are of course possible.

The present invention is not limited to the above-described embodiments, and variations and modifications may be made without departing from the scope of the present invention.

What is claimed is:

1. An optical scanning apparatus comprising:
   a light source;
   a first optical system which includes a coupling lens for coupling a beam from said light source;
   a polygon mirror for deflecting the beam from said first optical system at a constant angular velocity; and
   a second optical system which includes a scanning and imaging element for converging the beam deflected by said polygon mirror on a scanned surface so as to scan the scanned surface substantially at a constant velocity, wherein the following conditions are satisfied:

$$\Theta/2 < \alpha < (4\pi/N) - (\Theta/2) \quad (1)$$

$$R \cdot \sin(\alpha/2) \cdot 1.03 < h < R \cdot \sin(\alpha/2) \cdot 1.1 \quad (2)$$

where N indicates the number of deflecting and reflecting surfaces of said polygon mirror, R indicates a radius of an inscribed circle in the deflecting and reflecting surface, $\alpha$ indicates an angle formed by a chief ray of the beam deflected by said polygon mirror so as to be perpendicular to the scanned surface and an optical axis of said first optical system, $\Theta$ indicates an angular field of view that corresponds to an effective write width on the scanned surface and h indicates a distance between a center of rotation of said polygon mirror and the optical axis of said first optical system, a lateral magnification M of said scanning and imaging elements in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view $\Theta$ forms an angle $\Theta_1$ with respect to a direction perpendicular to the scanned surface and that the chief ray of the deflected beam located at the other end of the angular field of view $\Theta$ forms an angle $\Theta_2$ with respect to the direction perpendicular to the scanned surface, the angles $\Theta_1$ and $\Theta_2$ are configured such that $\Theta=\Theta_1+\Theta_2$ and such that $\Theta_1 \neq \Theta_2$.

2. The optical scanning apparatus as claimed in claim 1, wherein at least one of optical elements that constitute said scanning and imaging element is provided with a shift $\Delta$ in a direction corresponding to a main-scanning direction and/or with a tilt $\Theta$ on a plane of deflection.

3. The optical scanning apparatus as claimed in claim 1, wherein said scanning and imaging element is embodied by a scanning and imaging lens having a single-lens construction.

4. The optical scanning apparatus as claimed in claim 3, wherein said scanning and imaging lens has one surface thereof formed as a special toric surface wherein a line connecting centers of curvature within a plane perpendicular to the plane of deflection is not straight.

5. The optical scanning apparatus as claimed in claim 1, wherein said first optical system forms an image elongated in a direction corresponding to a main-scanning direction, in the neighborhood of the deflecting and reflecting surface of said polygon mirror, and said second optical system places a position of deflection and reflection at the polygon mirror and a position of the scanned surface in a substantially conjugated arrangement in a direction corresponding to a sub-scanning direction.

6. An optical scanning apparatus comprising:

a light source;

a first optical system which includes a coupling lens for coupling a beam from said light source;

a polygon mirror for deflecting the beam from said first optical system at a constant angular velocity; and a second optical system which includes a scanning and imaging lens for converging the beam deflected by said polygon mirror on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a shift $\Delta'$ in a direction corresponding to a main-scanning direction and a tilt $\beta'$ within the plane of deflection are provided between an incidence surface and an exit surface, and the following conditions are satisfied:

$$\Theta/2 < \alpha < (4\pi/N) - (\Theta/2) \tag{1}$$

$$R \cdot \sin(\alpha/2) \cdot 1.03 < h < R \cdot \sin(\alpha/2) \cdot 1.1 \tag{2}$$

where N indicates the number of deflecting and reflecting surfaces of said polygon mirror, R indicates a radius of an inscribed circle in the deflecting and reflecting surface, $\alpha$ indicates an angle formed by a chief ray of the beam deflected by said polygon mirror so as to be perpendicular to the scanned surface and an optical axis of said first optical system, $\Theta$ indicates an angular field of view that corresponds to an effective write width on the scanned surface and h indicates a distance between a center of rotation of said polygon mirror and the optical axis of said first optical system, a lateral magnification M of said scanning and imaging elements in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view $\Theta$ forms an angle $\Theta_1$ with respect to a direction perpendicular to the scanned surface and that the chief ray of the deflected beam located at the other end of the angular field of view $\Theta$ forms an angle $\Theta_2$ with respect to the direction perpendicular to the scanned surface, the angles $\Theta_1$ and $\Theta_2$ are configured such that $\Theta = \Theta_1 + \Theta_2$ and such that $\Theta_1 \neq \Theta_2$.

7. An optical scanning apparatus comprising:

a light source;

a first optical system which includes a coupling lens for coupling a beam from said light source;

a polygon mirror for deflecting the beam from said first optical system at a constant angular velocity; and a second optical system which includes a scanning and imaging lens for converging the beam deflected by said polygon mirror on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a shift $\Delta'$ in a direction corresponding to a main-scanning direction is provided between an incidence surface and an exit surface, and the following conditions are satisfied:

$$\Theta/2 < \alpha < (4\pi/N) - (\Theta/2) \tag{1}$$

$$R \cdot \sin(\alpha/2) \cdot 1.03 < h < R \cdot \sin(\alpha/2) \cdot 1.1 \tag{2}$$

where N indicates the number of deflecting and reflecting surfaces of said polygon mirror, R indicates a radius of an inscribed circle in the deflecting and reflecting surface, $\alpha$ indicates an angle formed by a chief ray of the beam deflected by said polygon mirror so as to be perpendicular to the scanned surface and an optical axis of said first optical system, $\Theta$ indicates an angular field of view that corresponds to an effective write width on the scanned surface and h indicates a distance between a center of rotation of said polygon mirror and the optical axis of said first optical system, a lateral magnification M of said scanning and imaging lens in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view $\Theta$ forms an angle $\Theta_1$ with respect to a direction perpendicular to the scanned surface and that the chief ray of the deflected beam located at the other end of the angular field of view $\Theta$ forms an angle $\Theta_2$ with respect to the direction perpendicular to the scanned surface, the angles $\Theta_1$ and $\Theta_2$ are configured such that $\Theta = \Theta_1 + \Theta_2$ and such that $\Theta_1 \neq \Theta_2$.

8. An optical scanning apparatus comprising:

a light source;

a first optical system which includes a coupling lens for coupling a beam from said light source;

a polygon mirror for deflecting the beam from said first optical system at a constant angular velocity; and a second optical system which includes a scanning and imaging lens for converging the beam deflected by said polygon mirror on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a tilt $\beta'$ within the plane of deflection is provided between an incidence surface and an exit surface, and the following conditions are satisfied:

$$\Theta/2 < \alpha < (4\pi/N) - (\Theta/2) \tag{1}$$

$$R \cdot \sin(\alpha/2) \cdot 1.03 < h < R \cdot \sin(\alpha/2) \cdot 1.1 \tag{2}$$

where N indicates the number of deflecting and reflecting surfaces of said polygon mirror, R indicates a radius of an inscribed circle in the deflecting and reflecting surface, $\alpha$ indicates an angle formed by a chief ray of the beam deflected by said polygon mirror so as to be perpendicular to the scanned surface and an optical axis of said first optical system, $\Theta$ indicates an angular field of view that corresponds to an effective write width on the scanned surface and h indicates a distance between a center of rotation of said polygon mirror and the optical axis of said first optical system, a lateral magnification M of said scanning and imaging lens in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view $\Theta$ forms an angle $\Theta_1$ with respect to a direction perpendicular to the scanned surface and that the chief ray of the deflected beam located at the other end of the angular field of view $\Theta$ forms an angle $\Theta_2$ with respect to the direction perpendicular to the scanned surface, the angles $\Theta_1$ and $\Theta_2$ are configured such that $\Theta=\Theta_1+\Theta_2$ and such that $\Theta_1 \neq \Theta_2$.

9. The optical scanning apparatus as claimed in claim 6, wherein said scanning and imaging lens has a single-lens construction.

10. The optical scanning apparatus as claimed in claim 7, wherein said scanning and imaging lens has a single-lens construction.

11. The optical scanning apparatus as claimed in claim 8, wherein said scanning and imaging lens has a single-lens construction.

12. The optical scanning apparatus as claimed in claim 7, wherein said scanning and imaging lens has one surface thereof formed as a special toric surface wherein a line connecting centers of curvature within a plane perpendicular to the plane of deflection is not straight.

13. The optical scanning apparatus as claimed in claim 7, wherein said scanning and imaging lens has one surface thereof formed as a special toric surface wherein a line connecting centers of curvature within a plane perpendicular to the plane of deflection is not straight.

14. The optical scanning apparatus as claimed in claim 8, wherein said scanning and imaging lens has one surface thereof formed as a special toric surface wherein a line connecting centers of curvature within a plane perpendicular to the plane of deflection is not straight.

15. The optical scanning apparatus as claimed in claim 6, wherein said first optical system forms an image elongated in a direction corresponding to a main-scanning direction, in the neighborhood of the deflecting and reflecting surface of said polygon mirror, and said second optical system places a position of deflection and reflection at the polygon mirror and a position of the scanned surface in a substantially conjugated arrangement in a direction corresponding to a sub-scanning direction.

16. The optical scanning apparatus as claimed in claim 7, wherein said first optical system forms an image elongated in a direction corresponding to a main-scanning direction, in the neighborhood of the deflecting and reflecting surface of said polygon mirror, and said second optical system places a position of deflection and reflection at the polygon mirror and a position of the scanned surface in a substantially conjugated arrangement in a direction corresponding to a sub-scanning direction.

17. The optical scanning apparatus as claimed in claim 8, wherein said first optical system forms an image elongated in a direction corresponding to a main-scanning direction, in the neighborhood of the deflecting and reflecting surface of said polygon mirror, and said second optical system places a position of deflection and reflection at the polygon mirror and a position of the scanned surface in a substantially conjugated arrangement in a direction corresponding to a sub-scanning direction.

18. An optical scanning apparatus comprising:

light source means;

first optical system means which includes a coupling lens for coupling a beam from said light source means;

polygon mirror means for deflecting the beam from said first optical system means at a constant angular velocity; and second optical system means which includes a scanning and imaging element for converging the beam deflected by said polygon mirror means on a scanned surface so as to scan the scanned surface substantially at a constant velocity, wherein the following conditions are satisfied:

$$\Theta/2 < \alpha < (4\pi/N) - (\Theta/2) \qquad (1)$$

$$R \cdot \sin(\alpha/2) \cdot 1.03 < h < R \cdot \sin(\alpha/2) \cdot 1.1 \qquad (2)$$

where N indicates the number of deflecting and reflecting surfaces of said polygon mirror means, R indicates a radius of an inscribed circle in the deflecting and reflecting surface, $\alpha$ indicates an angle formed by a chief ray of the beam deflected by said polygon mirror means so as to be perpendicular to the scanned surface and an optical axis of said first optical system means, $\Theta$ indicates an angular field of view that corresponds to an effective write width on the scanned surface and h indicates a distance between a center of rotation of said polygon mirror means and the optical axis of said first optical system means, a lateral magnification M of said scanning and imaging elements in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view $\Theta$ forms an angle $\Theta_1$ with respect to a direction perpendicular to the scanned surface and that the chief ray of the deflected beam located at the other end of the angular field of view $\Theta$ forms an angle $\Theta_2$ with respect to the direction perpendicular to the scanned surface, the angles $\Theta_1$ and $\Theta_2$ are configured such that $\Theta=\Theta_1+\Theta_2$ and such that $\Theta_1 \neq \Theta_2$.

19. An optical scanning apparatus comprising:

light source means;

first optical system means which includes a coupling lens for coupling a beam from said light source means;

polygon mirror means for deflecting the beam from said first optical system means at a constant angular velocity; and second optical system means which includes a scanning and imaging lens for converging the beam deflected by said polygon mirror means on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a shift Δ' in a direction corresponding to a main-scanning direction and a tilt β' within the plane of deflection are provided between an incidence surface and an exit surface, and the following conditions are satisfied:

$$\Theta/2 < \alpha < (4\pi/N) - (\Theta/2) \tag{1}$$

$$R \cdot \sin(\alpha/2) \cdot 1.03 < h < R \cdot \sin(\alpha/2) \cdot 1.1 \tag{2}$$

where N indicates the number of deflecting and reflecting surfaces of said polygon mirror, R indicates a radius of an inscribed circle in the deflecting and reflecting surface, α indicates an angle formed by a chief ray of the beam deflected by said polygon mirror so as to be perpendicular to the scanned surface and an optical axis of said first optical system, Θ indicates an angular field of view that corresponds to an effective write width on the scanned surface and h indicates a distance between a center of rotation of said polygon mirror and the optical axis of said first optical system, a lateral magnification M of said scanning and imaging lens in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view Θ forms an angle $\Theta_1$ with respect to a direction perpendicular to the scanned surface and that the chief ray of the deflected beam located at the other end of the angular field of view Θ forms an angle $\Theta_2$ with respect to the direction perpendicular to the scanned surface, the angles $\Theta_1$ and $\Theta_2$ are configured such that $\Theta = \Theta_1 + \Theta_2$ and such that $\Theta_1 \neq \Theta_2$.

20. An optical scanning apparatus comprising:

light source means;

first optical system means which includes a coupling lens for coupling a beam from said light source means;

polygon mirror means for deflecting the beam from said first optical system means at a constant angular velocity; and second optical system means which includes a scanning and imaging lens for converging the beam deflected by said polygon mirror means on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a shift Δ' in a direction corresponding to a main-scanning direction is provided between an incidence surface and an exit surface, and the following conditions are satisfied:

$$\Theta/2 < \alpha < (4\pi/N) - (\Theta/2) \tag{1}$$

$$R \cdot \sin(\alpha/2) \cdot 1.03 < h < R \cdot \sin(\alpha/2) \cdot 1.1 \tag{2}$$

where N indicates the number of deflecting and reflecting surfaces of said polygon mirror, R indicates a radius of an inscribed circle in the deflecting and reflecting surface, α indicates an angle formed by a chief ray of the beam deflected by said polygon mirror so as to be perpendicular to the scanned surface and an optical axis of said first optical system, Θ indicates an angular field of view that corresponds to an effective write width on the scanned surface and h indicates a distance between a center of rotation of said polygon mirror and the optical axis of said first optical system, a lateral magnification M of said scanning and imaging lens in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view Θ forms an angle $\Theta_1$ with respect to a direction perpendicular to the scanned surface and that the chief ray of the deflected beam located at the other end of the angular field of view Θ forms an angle $\Theta_2$ with respect to the direction perpendicular to the scanned surface, the angles $\Theta_1$ and $\Theta_2$ are configured such that $\Theta = \Theta_1 + \Theta_2$ and such that $\Theta_1 \neq \Theta_2$.

21. An optical scanning apparatus comprising:

light source means;

first optical system means which includes a coupling lens for coupling a beam from said light source means;

polygon mirror means for deflecting the beam from said first optical system means at a constant angular velocity; and second optical system means which includes a scanning and imaging lens for converging the beam deflected by said polygon mirror means on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a tilt β' within the plane of deflection is provided between an incidence surface and an exit surface, and the following conditions are satisfied:

$$\Theta/2 < \alpha < (4\pi/N) - (\Theta/2) \tag{1}$$

$$R \cdot \sin(\alpha/2) \cdot 1.03 < h < R \cdot \sin(\alpha/2) \cdot 1.1 \tag{2}$$

where N indicates the number of deflecting and reflecting surfaces of said polygon mirror, R indicates a radius of an inscribed circle in the deflecting and reflecting surface, α indicates an angle formed by a chief ray of the beam deflected by said polygon mirror so as to be perpendicular to the scanned surface and an optical axis of said first optical system, Θ indicates an angular field of view that corresponds to an effective write width on the scanned surface and h indicates a distance between a center of rotation of said polygon mirror and the optical axis of said first optical system, a lateral magnification M of said scanning and imaging lens in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view Θ forms an angle $Θ_1$ with respect to a direction perpendicular to the scanned surface and that the chief ray of the deflected beam located at the other end of the angular field of view Θ forms an angle $Θ_2$ with respect to the direction perpendicular to the scanned surface, the angles $Θ_1$ and $Θ_2$ are configured such that $Θ=Θ_1+Θ_2$ and such that $Θ_1≠Θ_2$.

22. An image forming apparatus comprising:

a light source;

a first optical system which includes a coupling lens for coupling a beam from said light source;

a polygon mirror for deflecting the beam from said first optical system at a constant angular velocity; and a second optical system which includes a scanning and imaging element for converging the beam deflected by said polygon mirror on a scanned surface so as to scan the scanned surface substantially at a constant velocity, wherein the following conditions are satisfied:

$$Θ/2<α<(4π/N)-(Θ/2) \quad (1)$$

$$R·\sin(α/2)·1.03<h<R·\sin(α/2)·1.1 \quad (2)$$

where N indicates the number of deflecting and reflecting surfaces of said polygon mirror, R indicates a radius of an inscribed circle in the deflecting and reflecting surface, α indicates an angle formed by a chief ray of the beam deflected by said polygon mirror so as to be perpendicular to the scanned surface and an optical axis of said first optical system, Θ indicates an angular field of view that corresponds to an effective write width on the scanned surface and h indicates a distance between a center of rotation of said polygon mirror and the optical axis of said first optical system, a lateral magnification M of said scanning and imaging elements in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view Θ forms an angle $Θ_1$ with respect to a direction perpendicular to the scanned surface and that the chief ray of the deflected beam located at the other end of the angular field of view Θ forms an angle $Θ_2$ with respect to the direction perpendicular to the scanned surface, the angles $Θ_1$ and $Θ_2$ are configured such that $Θ=Θ_1+Θ_2$ and such that $Θ_1≠Θ_2$.

23. An image forming apparatus comprising:

a light source;

a first optical system which includes a coupling lens for coupling a beam from said light source;

a polygon mirror for deflecting the beam from said first optical system at a constant angular velocity; and a second optical system which includes a scanning and imaging lens for converging the beam deflected by said polygon mirror on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a shift Δ' in a direction corresponding to a main-scanning direction and a tilt β within the plane of deflection are provided between an incidence surface and an exit surface, and the following conditions are satisfied:

$$Θ/2<α<(4π/N)-(Θ/2) \quad (1)$$

$$R·\sin(α/2)·1.03<h<R·\sin(α/2)·1.1 \quad (2)$$

where N indicates the number of deflecting and reflecting surfaces of said polygon mirror, R indicates a radius of an inscribed circle in the deflecting and reflecting surface, α indicates an angle formed by a chief ray of the beam deflected by said polygon mirror so as to be perpendicular to the scanned surface and an optical axis of said first optical system, Θ indicates an angular field of view that corresponds to an effective write width on the scanned surface and h indicates a distance between a center of rotation of said polygon mirror and the optical axis of said first optical system, a lateral magnification M of said scanning and imaging elements in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view Θ forms an angle $Θ_1$ with respect to a direction perpendicular to the scanned surface and that the chief ray of the deflected beam located at the other end of the angular field of view Θ forms an angle $Θ_2$ with respect to the direction perpendicular to the scanned surface, the angles $Θ_1$ and $Θ_2$ are configured such that $Θ=Θ_1+Θ_2$ and such that $Θ_1≠Θ_2$.

24. An image forming apparatus comprising:

a light source;

a first optical system which includes a coupling lens for coupling a beam from said light source;

a polygon mirror for deflecting the beam from said first optical system at a constant angular velocity; and a second optical system which includes a scanning and imaging lens for converging the beam deflected by said polygon mirror on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a shift Δ' in a direction corresponding to a main-scanning direction is provided between an incidence surface and an exit surface, and the following conditions are satisfied:

$$Θ/2<α<(4π/N)-(Θ/2) \quad (1)$$

$$R·\sin(α/2)·1.03<h<R·\sin(α/2)·1.1 \quad (2)$$

where N indicates the number of deflecting and reflecting surfaces of said polygon mirror, R indicates a radius of an inscribed circle in the deflecting and reflecting surface, α indicates an angle formed by a chief ray of the beam deflected by said polygon mirror so as to be perpendicular to the scanned surface and an optical axis of said first optical system, Θ indicates an angular field of view that corresponds to an effective write width on the scanned surface and h indicates a distance between a center of rotation of said polygon mirror and the optical axis of said first optical system, a lateral magnification M of said scanning and imaging lens in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view $\Theta$ forms an angle $\Theta_1$ with respect to a direction perpendicular to the scanned surface and that the chief ray of the deflected beam located at the other end of the angular field of view $\Theta$ forms an angle $\Theta_2$ with respect to the direction perpendicular to the scanned surface, the angles $\Theta_1$ and $\Theta_2$ are configured such that $\Theta=\Theta_1+\Theta_2$ and such that $\Theta_1 \neq \Theta_2$.

25. An image forming apparatus comprising:

a light source;

a first optical system which includes a coupling lens for coupling a beam from said light source;

a polygon mirror for deflecting the beam from said first optical system at a constant angular velocity; and a second optical system which includes a scanning and imaging lens for converging the beam deflected by said polygon mirror on a scanned surface so as to scan the scanned surface substantially at a constant velocity, wherein said scanning and imaging lens includes at least one lens, at least one surface of said scanning and imaging lens has a non-arcuate configuration on a plane of deflection, and at least one lens of said scanning and imaging lens is constructed such that a tilt $\beta'$ within the plane of deflection is provided between an incidence surface and an exit surface, and the following conditions are satisfied:

$$\Theta/2 < \alpha < (4\pi/N) - (\Theta/2) \tag{1}$$

$$R \cdot \sin(\alpha/2) \cdot 1.03 < h < R \cdot \sin(\alpha/2) \cdot 1.1 \tag{2}$$

where N indicates the number of deflecting and reflecting surfaces of said polygon mirror, R indicates a radius of an inscribed circle in the deflecting and reflecting surface, $\alpha$ indicates an angle formed by a chief ray of the beam deflected by said polygon mirror so as to be perpendicular to the scanned surface and an optical axis of said first optical system, $\Theta$ indicates an angular field of view that corresponds to an effective write width on the scanned surface and h indicates a distance between a center of rotation of said polygon mirror and the optical axis of said first optical system, a lateral magnification M of said scanning and imaging lens in an unfolded subscanning direction is greater than 1 so that a distance between said second optical system and said scanned surface is enlarged, said condition (2) is set so that a curvature of field in said subscanning direction is reduced, thereby reducing effects of sag, and given that the chief ray of the deflected beam from the polygon mirror located at an end of the angular field of view $\Theta$ forms an angle $\Theta_1$ with respect to a direction perpendicular to the scanned surface and that the chief ray of the deflected beam located at the other end of the angular field of view $\Theta$ forms an angle $\Theta_2$ with respect to the direction perpendicular to the scanned surface, the angles $\Theta_1$ and $\Theta_2$ are configured such that $\Theta=\Theta_1+\Theta_2$ and such that $\Theta_1 \neq \Theta_2$.

* * * * *